(12) United States Patent
Suzuki et al.

(10) Patent No.: US 7,650,048 B2
(45) Date of Patent: Jan. 19, 2010

(54) IMAGE PROCESSOR AND IMAGE PROCESSING METHOD (75) Inventors: Takuma Suzuki, Wakayama (JP); Hiroyuki Okamoto, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 490 days.

(21) Appl. No.: 11/224,302

(22) Filed: Sep. 13, 2005

(65) Prior Publication Data

US 2006/0056734 A1  Mar. 16, 2006

(30) Foreign Application Priority Data

Sep. 14, 2004  (JP) .............................. 2004-266582

(51) Int. Cl.
*G06K 9/32* (2006.01)
*G09G 5/00* (2006.01)
(52) U.S. Cl. ........................ 382/298; 345/660; 345/668
(58) Field of Classification Search ......... 382/298–300; 345/660–671
See application file for complete search history.

(56) References Cited

U.S. PATENT DOCUMENTS

| | | | | |
|---|---|---|---|---|
| 5,161,035 A | * | 11/1992 | Muramatsu | .................. 358/451 |
| 5,978,522 A | | 11/1999 | Ishii et al. | |
| 6,124,841 A | * | 9/2000 | Aoyama | ..................... 345/636 |
| 6,674,551 B1 | * | 1/2004 | Takura | ....................... 358/451 |
| 6,714,692 B1 | * | 3/2004 | Kim et al. | ................... 382/299 |
| 6,856,706 B2 | * | 2/2005 | Yamada | ...................... 382/276 |
| 2002/0196470 A1 | * | 12/2002 | Kawamoto et al. | ......... 358/3.06 |
| 2003/0179953 A1 | * | 9/2003 | Ishizaka | ...................... 382/298 |
| 2004/0057634 A1 | * | 3/2004 | Mutoh | ......................... 382/298 |
| 2005/0013495 A1 | * | 1/2005 | Yoshigahara | ................ 382/233 |
| 2005/0140990 A1 | * | 6/2005 | Ueno et al. | ................... 358/1.2 |

FOREIGN PATENT DOCUMENTS

| | | |
|---|---|---|
| EP | 0 874 330 A | 10/1998 |
| EP | 1 261 195 A | 11/2002 |
| EP | 1 330 115 A | 7/2003 |
| EP | 1 383 081 A | 1/2004 |
| JP | 2002-199208 A | 7/2002 |

\* cited by examiner

*Primary Examiner*—Samir A. Ahmed
*Assistant Examiner*—Li Liu
(74) *Attorney, Agent, or Firm*—Smith Patent Office (57) ABSTRACT

An image processor includes an image processing section, an enlargement processing section, and a controller. When image data including a second predetermined number of pixels to be output from an image output section, is generated on the basis of image data including a first predetermined number of pixels smaller than the second predetermined number input to an image data input unit, the controller controls the enlargement processing section to generate image data including a third predetermined number of pixels larger than the first predetermined number and smaller than the second predetermined number. The controller controls the image processing section to apply image processing to the image data including the third predetermined number of pixels. The controller also controls the enlargement processing section to generate the image data including the second predetermined number of pixels on the basis of the image data including the third predetermined number of pixels.

17 Claims, 3 Drawing Sheets

IMAGE PROCESSOR AND IMAGE PROCESSING METHOD

BACKGROUND OF THE INVENTION

1. Field of the Invention

The present invention relates to an image processor and an image processing method for applying image processing to image data.

2. Description of Related Art

In recent years, photo processors in which so-called digital exposure methods are adopted, are coming to be widely used. In such a digital exposure method, an image can be formed by exposing a photographic printing paper to light that has been modulated on the basis of digital image data. By adopting the digital exposure method, various kinds of image processes, such as color correction, density correction, and sharpness processing, can be performed in a high degree of freedom. In addition, rapid reprint processing becomes possible. Further, a high-quality print superior in color reproducibility, density reproducibility, and resolution, can be obtained.

In a photo processor, there is a case wherein a large-sized image is formed on the basis of small-sized image data including therein pixels less than the large-sized image. Generally in this case, after image processing is applied to the small-sized image data, the small-sized image data is enlarged so that the number of pixels included in the small-sized image data is increased so as to correspond to the number of pixels of the image of the final print size, for example, as disclosed in JP-A-2002-199208.

Image processing to be applied to such image data may include cross filter processing for blurring light of each portion of the image high in brightness into a cross shape. By applying cross filter processing to the image data, high artistry and a special visual effect can be obtained, and realistic sensation and impact can be given to the photographic image.

However, in the case that the number of pixels included in small-sized image data as the original image data for enlargement processing, considerably differs from the number of pixels included in enlarged large-sized image data, a problem arises wherein the effect of cross filter processing applied to the small-sized image data before enlargement processing is performed, may reduce in an image formed on the basis of the enlarged large-sized image data. That is, in the case that the magnification of enlargement is too high, there is required a large number of additional pixels to be interpolated to compensate the difference between the number of pixels of the large-sized image data and the number of pixels of the small-sized image data. As a result, cross filter processing brings about conspicuous edges, and this reduces the effect of cross filter processing. To solve the problem, a measure is thinkable wherein the order of image processing and enlargement processing is changed so that cross filter processing is applied to the large-sized image data after the small-sized image data is enlarged into the large-sized image data. In this case, however, the rate of cross filter processing remarkably lowers though the effect of cross filter processing scarcely reduces.

SUMMARY OF THE INVENTION

An object of the present invention is to provide an image processor and an image processing method capable of suppressing both the lowering of the rate of image processing and the reduction of the effect of image processing.

According to an aspect of the present invention, an image processor comprises an image processing section that applies image processing to image data; an enlargement processing section that generates image data including pixels more than a predetermined number, on the basis of image data including the predetermined number of pixels; and a controller that controls the image processing section and the enlargement processing section. When image data to be output from an image output section, including a second predetermined number of pixels, to which image processing has been applied, is generated on the basis of image data input to an image data input unit, including a first predetermined number of pixels smaller than the second predetermined number, the controller controls the enlargement processing section to generate image data including a third predetermined number of pixels larger than the first predetermined number and smaller than the second predetermined number, on the basis of the image data input to the image data input unit, including the first predetermined number of pixels; controls the image processing section to apply image processing to the image data including the third predetermined number of pixels, generated by the enlargement processing section; and controls the enlargement processing section to generate the image data including the second predetermined number of pixels, on the basis of the image data including the third predetermined number of pixels, to which the image processing section has applied image processing.

According to another aspect of the present invention, an image processing method is for generating image data including a second predetermined number of pixels, to which image processing has been applied, on the basis of image data input to an image data input unit, including a first predetermined number of pixels smaller than the second predetermined number. The method comprises a first enlargement processing step of generating image data including a third predetermined number of pixels larger than the first predetermined number and smaller than the second predetermined number, on the basis of the image data input to the image data input unit, including the first predetermined number of pixels; a first image processing step of applying image processing to the image data including the third predetermined number of pixels, generated in the first enlargement processing step; and a second enlargement processing step of generating the image data including the second predetermined number of pixels, on the basis of the image data including the third predetermined number of pixels, to which image processing was applied in the first image processing step.

According to the present invention, the image data input to the image data input unit, including the first predetermined number of pixels, that is, input image data, is enlarged to the image data, that is, intermediate image data, including the third predetermined number of pixels larger than the first predetermined number and smaller than the second predetermined number as the number of pixels included in the image data to be output from the output section, that is, output image data. Afterward, image processing is applied to the intermediate image data, and then the intermediate image data is enlarged to the output image data. That is, the input image data is enlarged to the intermediate image data by the first time of enlargement processing, and then the intermediate image data to which image processing has been applied, is enlarged to the output image data by the second time of enlargement processing.

Therefore, the difference in the number of pixels between the image data before and after enlargement processing to the image data to which image processing has been applied, is little in comparison with a case wherein the input image data to which image processing has been applied, is enlarged to the output image data by one time of enlargement processing.

Thus, the reduction of the effect of image processing can be suppressed in an image formed on the basis of the output image data.

In addition, the number of pixels included in the image data to which image processing is to be applied, is small in comparison with a case wherein the input image data is enlarged to the output image data by one time of enlargement processing, and then image processing is applied to the output image data. Thus, the reduction of the rate of image processing can be suppressed.

Image processing according to the present invention means image processing the effect of which may reduce in an image formed on the basis of the output image data generated by applying enlargement processing to the input image data to which image processing has been applied. Image processing according to the present invention does not include enlargement processing, and includes, for example, cross filter processing, soft filter processing, or the like.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENT

Figure 1:
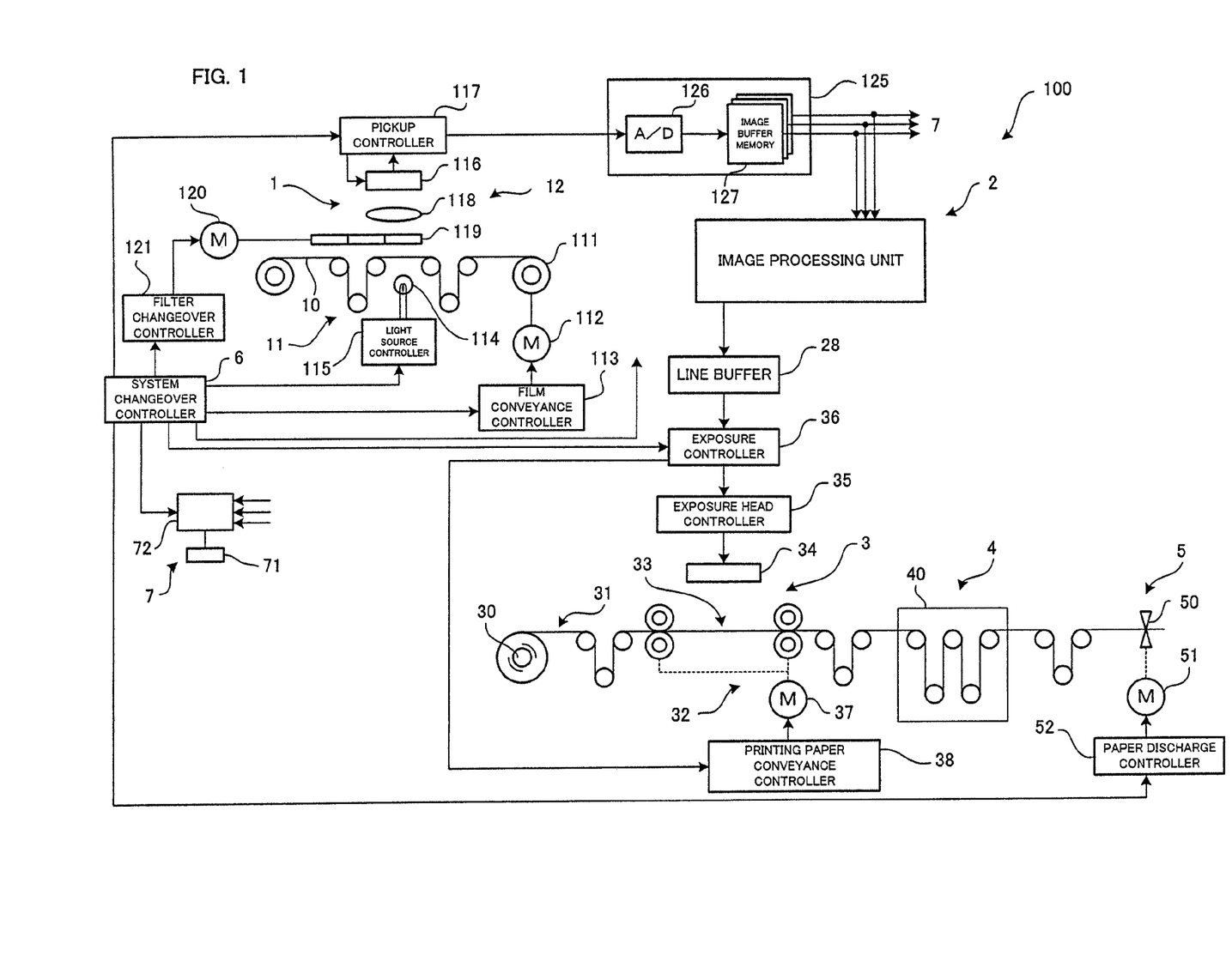
FIG. 1 is a diagram showing a general construction of a photo processor including an image processing unit according to an embodiment of the present invention.

Hereinafter, a preferred embodiment of the present invention will be described with reference to drawings. FIG. 1 is a diagram showing a general construction of a photo processor including an image processing unit according to the embodiment of the present invention.

The photo processor 100 of FIG. 1 includes therein an image data input unit 1, an image processing unit 2, a line buffer 28, an image exposure unit 3, a development processing unit 4, a paper discharge unit 5, and a system controller 6. The image data input unit 1 photoelectrically converts a photographic image formed on a color silver salt film, into image data as a digital image, and stores the image data in a memory. The image processing unit 2 applies processing, such as enlargement processing and cross filter processing, to the image data input from the image data input unit 1. The line buffer 28 sequentially outputs the image data processed by the image processing unit 2. The image exposure unit 3 includes an exposure head 34 for exposing a photographic printing paper on the basis of the image data output from the line buffer 28. The development processing unit 4 applies development processing to the exposed printing paper. The paper discharge unit 5 cuts the developed printing-paper in a unit of one frame, and discharges the cut papers. The system controller 6 coordinately controls the operations of the above-described functional blocks.

The image data input unit 1 includes a film conveyance section 11 and an image pickup section 12. The film conveyance section 11 intermittently conveys, for example, a developed 135 color negative film 10, so that each frame of the film 10 is put at a pickup position in order. The image pickup section 12 picks up the image of each frame of the film 10.

The film conveyance section 11 includes a taking-up roller 111, a film conveyance motor 112 for driving the taking-up roller 111 to rotate, and a film conveyance controller 113 for controlling the film conveyance motor 112.

The image pickup section 12 includes a light source 114, a light source controller 115, an image pickup device 116, a pickup controller 117, a lens 118- an optical filter 119, a filter drive motor 120, a filter changeover controller 121, and an image data storage unit 125. The light source 114 is disposed under the film 10. The light source controller 115 controls the intensity of light to be emitted from the light source. The image pickup device 116 has therein a two-dimensional CCD. The pickup controller 117 controls the image pickup device 116 to pick up an image. The lens 118 focuses light from the image of each frame of the film 10, onto a light receiving surface of the image pickup device 116. The optical filter 119 is provided between the film 10 and the lens 118 to separate the image from the film 10 into three colors of G, R, and B. The filter drive motor 120 drives the optical filter 119 to change over the function of the filter 119. The filter changeover controller 121 controls the drive of the filter drive motor 120. The image data storage unit 125 stores therein an image signal picked up by the image pickup device 116, as digital data.

The image data storage unit 125 includes therein an A/D converter 126 and an image buffer memory 127. The A/D converter 126 converts the respective analogue image signals of R, G, and B, picked up by the image pickup device 116, into digital image data of R, G, and B by 16-bits gradation levels. The image buffer memory 127 is made of a RAM or the like for storing digital image data of three colors of R, G, and B, converted by the A/D converter 126, in a unit of one frame.

The image processing unit 2 applies preliminary processing, enlargement processing, and cross filter processing to image data stored in the image data storage unit 125. Each line of the image data is output the exposure controller 36 through the line buffer memory 28. A specific construction of the image processing unit 2 will be described later in detail.

The image exposure unit 3 includes a printing paper conveyance section 32, a PLZT type exposure head 34, an exposure head controller 35, and an exposure controller 36. The printing paper conveyance section 32 includes therein a printing paper conveyance controller 38 for conveying a long printing paper 31 wound up on a roll 30 within a roll cassette, toward an exposure station 33 at a predetermined speed by a conveyance motor 37. The exposure head 34 scans the printing paper 31 having conveyed to the exposure station 33, to expose the printing paper 31. The exposure head controller 35 controls the drive of the exposure head 34. The exposure controller 36 outputs image data received from the line buffer 28, to the exposure head controller 35 at predetermined timings synchronous with the conveyance speed of the printing paper 31.

The development processing unit 4 includes a development bath 40 filled up with development processing liquid such as developer. The development processing unit 4 further includes a not-shown conveyance controller for conveying the exposed printing paper 31 into the development bath 40, and conveying the printing paper 31 to which processing of development, bleaching, and fixture, has been applied, to the paper discharge unit 5.

The paper discharge unit 5 includes therein a cutter 50, a cutter motor 51, and a discharge controller 52. The cutter 50 laterally cuts the printing paper 31 developed by the development processing unit 4, into each piece of paper in a unit of one frame. The cutter motor 51 drives the cutter 50. The discharge controller 52 controls the drive of the cutter motor 51, and the discharge operation for discharging the cut pieces of the printing paper 31 out of the photo processor 100.

The system controller 6 is for coordinately controlling the above-described functional blocks on the basis or a control program. The system controller 6 includes therein a CPU for control, a ROM storing therein the control program, a RAM for data processing, and an input/output circuit for control signals for the functional blocks. To the system controller 6 connected is a console 7 including an input device 71 for setting and inputting a procedure or the like in the photo processor 100, and a monitor device 72.

Figure 2:
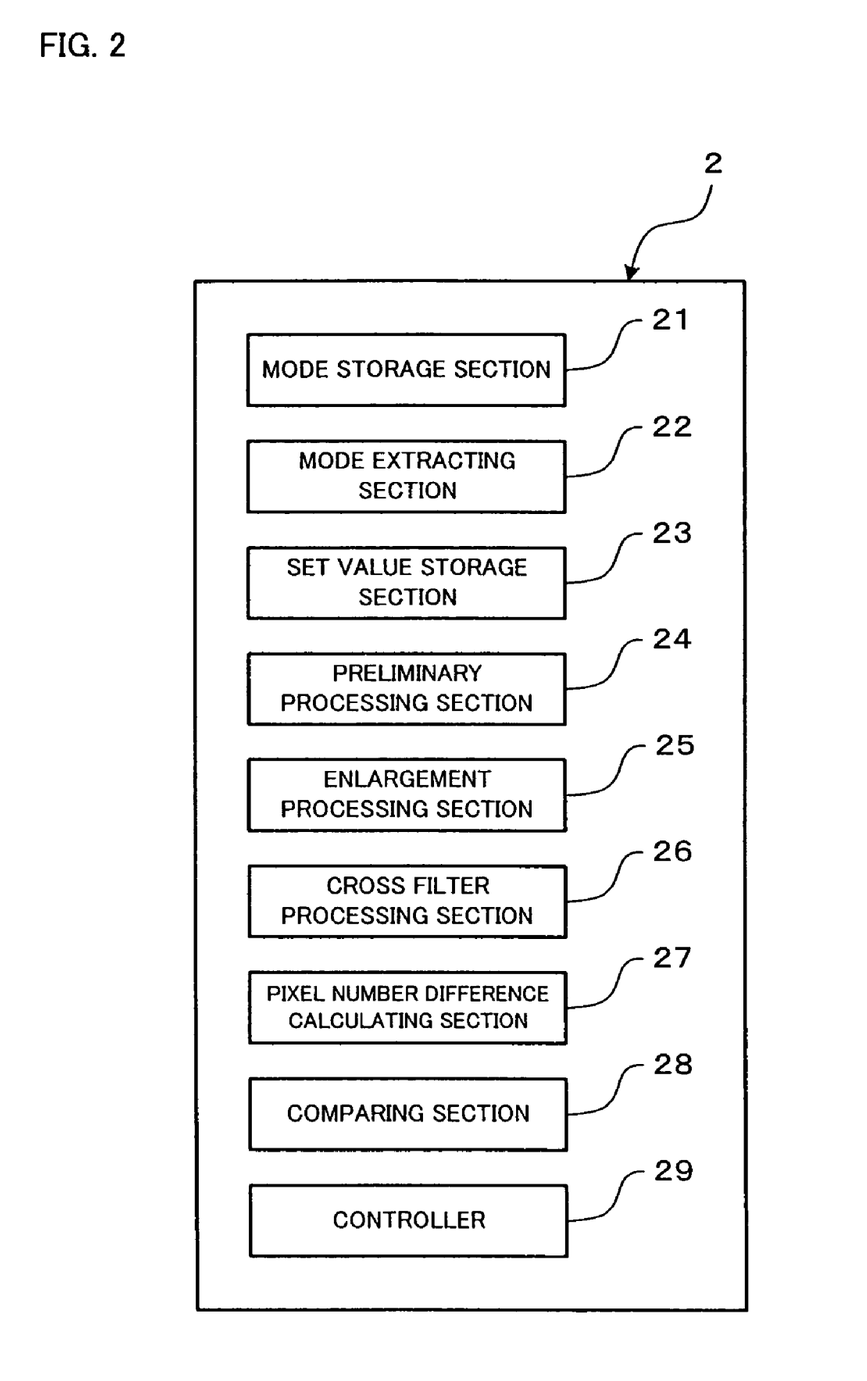
FIG. 2 is a block diagram showing a construction of the image processing unit of FIG. 1.

Next, a specific construction of the image processing unit 2 will be described with reference to FIG. 2. FIG. 2 is a block diagram showing a construction of the image processing unit 2.

The image processing unit 2 includes a mode storage section 21, a mode extracting section 22, a set value storage section 23, a preliminary processing section 24, an enlargement processing section 25, a cross filter processing section 26, a pixel number difference calculating section 27, a comparing section 28, and a controller 29.

The mode storage section 21 stores therein a plurality of modes concerning the order of enlargement processing and cross filter processing to be performed in the image processing unit 2. In this embodiment, the mode storage section 21 stores three modes, that is, normal, quality, and speed modes. These modes differ from one another in the order of enlargement processing and cross filter processing.

The order of enlargement processing and cross filter processing in each mode will be described.

In the normal mode, first, enlargement processing is performed on the basis of small-sized image data including a relatively small number of pixels, input from the image data input unit 1, which image data will be referred to as input image data, to generate image data, which will be referred to as intermediate image data, including a number of pixels larger than the number of pixels of the input image data and smaller than the number of pixels of large-sized image data including a relatively large number of pixels, to be output from the image processing unit 2, which large-sized image data will be referred to as output image data. Cross filter processing is then applied to the intermediate image data. Afterward, enlargement processing is applied to the intermediate image data to which cross filter processing has been applied, so as to enlarge the intermediate image data to the output image data. Enlargement processing and cross filter processing are performed in the order of the normal mode only in the case that a predetermined comparison result is obtained in the comparing section 28.

In the quality mode, the quality of an image to be formed on a printing paper is most heavily weighed, and the rate of cross filter processing to be applied to image data is not so heavily weighed. In the quality mode, therefore, enlargement processing is performed on the basis of input image data to generate output image data, and then cross filter processing is applied to the output image data.

In the speed mode, the rate of cross filter processing to be applied to image data is most heavily weighed, and the quality of the image to be formed on a printing paper is not so heavily weighed. In the speed mode, therefore, cross filter processing is applied to input image data, and then enlargement processing is performed on the basis of the input image data to which cross filter processing has been applied, to generate output image data.

The mode extracting section 22 extracts one of three modes stored in the mode storage section 21. In this embodiment, the mode extracting section 22 extracts one mode in accordance with an instruction input by an operator operating the input device 71. In this embodiment, a state wherein one mode has been extracted by the mode extracting section 22 may be referred to as a state wherein the extracted mode has been set.

The set value storage section 23 stores therein the number of pixels of image data to be output from the image processing unit 2, that is, the number of pixels of an image to be formed in the image exposure unit 3, as the number of pixels of image data of an output size. In addition, the set value storage section 23 stores therein a reference value to be used when it is judged whether or not image processing in the normal mode should be actually performed in the case that the normal mode has been set. Numerical values to be stored in the set value storage section 23 are input by the operator operating the input device 71.

In the case that an image is formed on the basis of output image data generated by applying enlargement processing to input image data to which cross filter processing has been applied, the above-described reference value is preferably set to a value corresponding to the difference in the number of pixels between the input image data and output image data when the reduction of the effect of cross filter processing is little and inconspicuous on the formed image.

The preliminary processing section 24 applies image processing required before enlargement processing is applied to image data, such as CCD noise reduction processing and speckle noise reduction processing, to the image data input from the image data input unit 2.

The enlargement processing section 25 performs enlargement processing to enlarge image data of an input size or image data of an intermediate size, that is, to increase the number of pixels included in image data. In this embodiment, the density between pixels included in the original image data is obtained by, for example, a bicubic method or a bylinear method, and pixels having the obtained density are added between the pixels of the original image data to increase the number of pixels included in the image data.

The cross filter processing section 26 applies cross filter processing to image data. Cross filter processing is processing for blurring light of each portion of the image high in brightness into a cross shape. The shape to be obtained by blurring by cross filter processing is not limited to such a cross shape. The shape may be changed into, for example, a hexagram, an octagram, etc.

The pixel number difference calculating section 27 subtracts the number of pixels included in input image data from the number of pixels included in output image data to calculate the difference in the number of pixels between the input and output image data.

The comparing section 28 compares the difference in the number of pixels, calculated by the pixel number difference calculating section 27, with the reference value stored in the set value storage section 23.

The controller 29 controls the order of processing in the image processing unit 2 in each mode. Here will be described the order of enlargement processing and cross filter processing.

More specifically, in the case that the normal mode has been set and the comparing section 28 has obtained a comparison result indicating that the difference in the number of pixels, calculated by the pixel number difference calculating section 27, is more than the reference value, image processing is performed in the order of enlargement processing in the enlargement processing section 25 to the intermediate size, cross filter processing in the cross filter processing section 26, and enlargement processing in the enlargement processing section 25 to the output size.

In the case that the normal mode has been set and the comparing section 28 has obtained a comparison result indicating that the difference in the number of pixels, calculated by the pixel number difference calculating section 27, is not more than the reference value, or in the case that the quality mode has been set, image processing is performed in the order of enlargement processing in the enlargement processing section 25 to the output size, and cross filter processing in the cross filter processing section 26.

In the case that the speed mode has been set, image processing is performed in the order of cross filter processing in the cross filter processing section 26, and enlargement processing in the enlargement processing section 25 to the output size.

Figure 3:
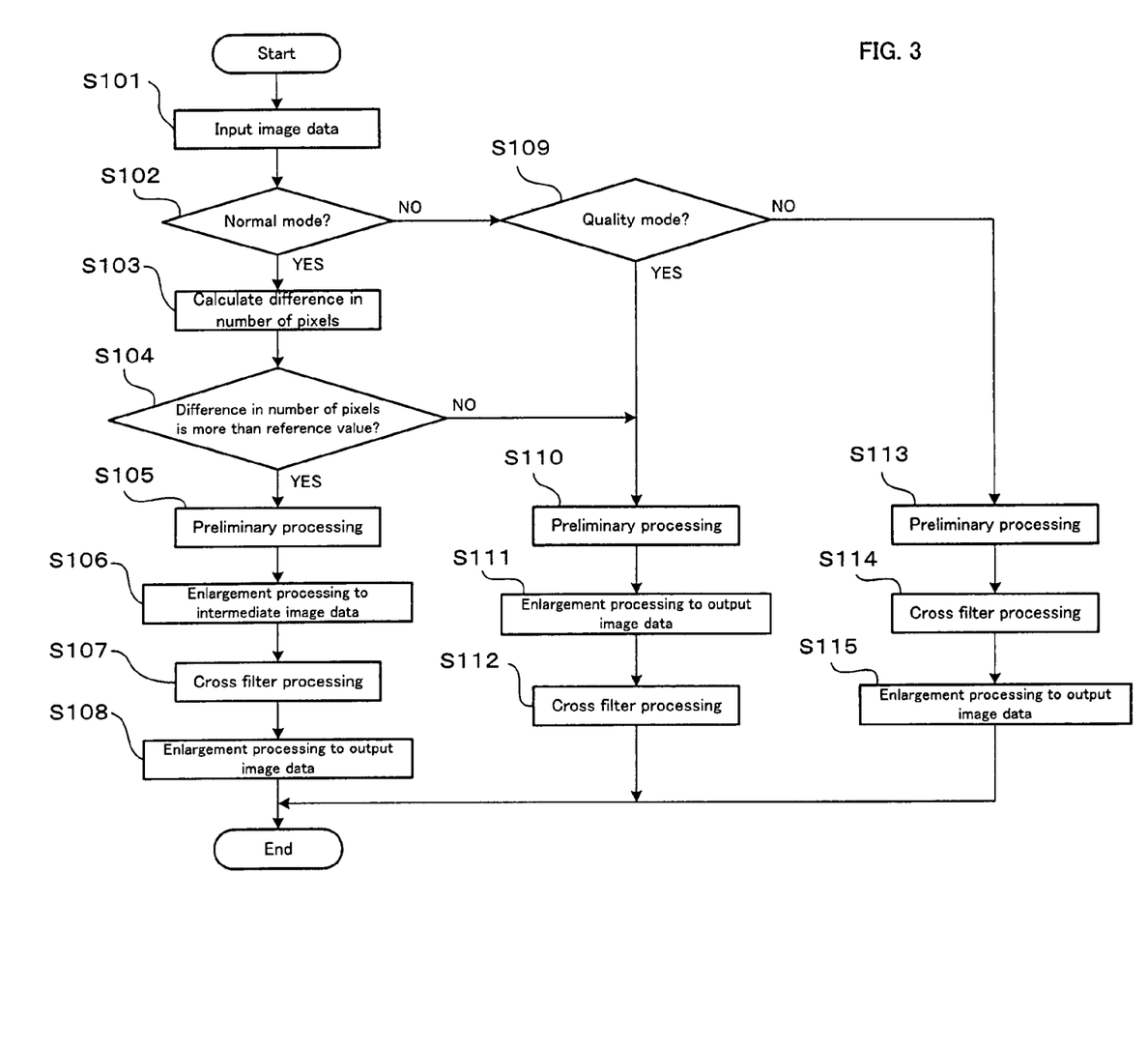
FIG. 3 is a flowchart showing a procedure when the image processing unit applies processing to image data.

Next, a procedure when the image processing unit 2 applies processing to image data will be described with reference to FIG. 3. FIG. 3 is a flowchart showing the procedure when the image processing unit applies processing to image data.

In this embodiment, a case will be described wherein input image data input from the image input unit 1 includes 960×720=691200 pixels, and output image data to be output from the image processing unit 2 includes 7200×5400=38880000 pixels. Further in the case, a value of 5400×3600=19440000 pixels has been set as the reference value in the set value storage section 23.

In this case, therefore, the difference in the number of pixels between the input image data and the output image data is 38880000−691200=38188800. Thus, the difference in the number of pixels between the input image data and the output image data is more than the reference value. As a result, in the case of the normal mode, processing is performed actually in the order according to the normal mode.

First, input image data is input from the image input unit 1, in Step S101. It is then judged whether or not the mode extracted by the mode extracting section 22 is the normal mode, in Step S102. When the extracted mode is the normal mode, that is, YES in Step S102, the number of pixels included in the input image data is subtracted from the number of pixels included in output image data to calculate the difference in the number of pixels between both image data, in Step S103. The difference in the number of pixels, calculated as described above, is then compared with the reference value, in Step S104.

When the calculated value is more than the reference value, that is, YES in Step S104, preliminary processing is applied to the input image data in Step S105, and then the input image data is enlarged to intermediate image data in Step S106. In this embodiment, the intermediate image data includes 3000×2250=6750000 pixels.

Cross filter processing is applied to the intermediate image data in Step S107. Afterward, the intermediate image data to which cross filter processing has been applied is enlarged to the output image data in Step S108, and then the flow ends.

When the extracted mode is not the normal mode in the judgment of Step S102, that is, NO in Step S102, it is then judged whether or not the extracted mode is the quality mode, in Step S109. When the extracted mode is the quality mode, that is, YES in Step S109, preliminary processing is applied to the input image data in Step S110, and then the input image data is enlarged to the output image data in Step S111. Cross filter processing is applied to the output image data in Step S112, and then the flow ends.

When the difference in the number of pixels is not more than the reference value in the judgment of Step S104, that is, NO in Step S104, the flow advances to Step S110, and thereafter the same process as described above is performed.

When the extracted mode is not the quality mode in the judgment of Step S109, that is, NO in Step S109, the extracted mode is the speed mode. Thus, preliminary processing is applied to the input image data in Step S113, and then cross filter processing is applied to the input image data in Step S114. Afterward, the input image data is enlarged to the output image data in Step S115, and then the flow ends.

As described above, in the image processing unit 2 of this embodiment, when the normal mode has been set and the difference in the number of pixels between the input image data and the output image data is more than the reference value, the input image data input from the image data input unit 1 is enlarged to the intermediate image data including the number of pixels, more than the number of pixels of the input image data and less than the number of pixels of the output image data to be output from the image processing unit 2. Cross filter processing is applied to the intermediate image data, and then the intermediate image data to which cross filter processing has been applied is enlarged to the output image data.

Therefore, when image data to which cross filter processing has been applied is enlarged, the difference in the number of pixels between the image data before and after enlargement processing is small in comparison with a case wherein the input image data to which cross filter processing has been applied is enlarged to the output image data by one time of enlargement processing. This suppresses the reduction of the effect of cross filter processing in an image formed on the basis of the output image data.

Further in this case, the number of pixels included in the image data to which cross filter processing is applied is small in comparison with a case wherein the input image data is enlarged to the output image data by one time of enlargement processing and then cross filter processing is applied. This suppresses the reduction of the rate of cross filter processing.

Further, when the difference in the number of pixels between the input image data and the output image data is more than the reference value, the input image data is enlarged to the intermediate image data by the first time of enlargement processing; cross filter processing is applied to the intermediate image data; and then the intermediate image data to which cross filter processing has been applied is enlarged to the output image data by the second time of enlargement processing. Thus, only when the reduction of the effect of cross filter processing is relatively considerable, enlargement processing and cross filter processing can be performed in the order according to the normal mode.

In the case that the difference in the number of pixels between image data before and after enlargement processing when the intermediate image data to which cross filter processing has been applied is enlarged, that is, the difference in the number of pixels between the intermediate image data and the output image data, is less than the reference value, the reduction of the effect of cross filter processing is little and inconspicuous in an image formed on the basis of the output image data.

The mode storage section 21 stores therein three of the normal, quality, and speed modes. By setting one of them to the mode extracting section 22, the order of enlargement processing and cross filter processing can be changed in accordance with the purpose.

In the case that the quality mode has been set, cross filter processing is applied to the input image data, and then the input image data to which cross filter processing has been applied is enlarged to the output image data by one time of enlargement processing. Thus, the number of pixels included in image data to which cross filter processing is to be applied, can be decreased as much as possible. This makes the rate of cross filter processing higher.

In the case that the speed mode has been set, the input image data is enlarged to the output image data by one time of enlargement processing, and then cross filter processing is applied to the output image data. Thus, the reduction of the effect of cross filter processing can be suppressed in an image formed on the basis of the output image data, as much as possible. This improves the quality of the image formed on the basis of the output image data.

In the above-described embodiment, only when the difference in the number of pixels between the input image data and the output image data is more than the reference value in the normal mode, enlargement processing and cross filter processing are performed in the order according to the normal mode. In a modification, however, enlargement processing and cross filter processing may be performed in the order according to the normal mode even when the difference in the number of pixels between the input image data and the output image data is not more than the reference value.

In the above-described embodiment, the mode storage section 21 stores therein three modes. However, the number of modes to be stored in the mode storage section 21 may be changed. For example, in a modification, the mode storage section 21 may store therein only the normal mode, and enlargement processing and cross filter processing may be performed always in the order according to the normal mode. In another modification, in addition to the normal mode, the mode storage section 21 may store therein a mode other than the quality and speed modes. In this modification, enlargement processing and cross filter processing may be performed in the order other than the order according to either of the quality and speed modes.

In the above-described embodiment, cross filter processing has been described as an objective kind of image processing. However, the present invention brings about its effect even in any kind of image processing in which the effect of image processing may reduce in an image formed on the basis of output image data generated by enlarging input image data to which image processing has been applied, for example, in soft filter processing for scumbling the image.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image processor comprising:
   an image data input unit that inputs input image data including a first predetermined number of pixels;
   an enlargement processing section that generates output image data including a second predetermined number of pixels more than the first predetermined number, on the basis of the input image data including the first predetermined number of pixels, the enlargement processing section also generates intermediate image data including a third predetermined number of pixels larger than the first predetermined number and smaller than the second predetermined number, on the basis of the input image data input to the image data input unit, including the first predetermined number of pixels;
   an image processing section that applies image processing to at least one of the input image data, the intermediate image data and the output image data;
   a controller that controls the image processing section and the enlargement processing section, and
   an image data output section that outputs the output image data processed by the enlargement processing section and the image processing section;
   wherein the controller controls the enlargement processing section to generate the intermediate image data, when a calculated value corresponding to a difference between the first and the second predetermined numbers exceeds a reference value which is used at the time of determining whether to generate the intermediate image data and perform the image processing to the intermediate image data;
   the controller controls the image processing section to apply image processing to the intermediate image data including the third predetermined number of pixels, generated by the enlargement processing section, and
   the controller controls the enlargement processing section to generate the output image data including the second predetermined number of pixels, on the basis of the intermediate image data including the third predetermined number of pixels, to which the image processing section has applied image processing.

2. The image processor according to claim 1, wherein the difference between the third and second predetermined numbers is less than the reference value.

3. The image processor according to claim 1, further comprising:
   a mode storage section that stores therein a plurality of modes different from each other in the order of image processing and enlargement processing when the output image data to be output from the image output section, including the second predetermined number of pixels, to which image processing has been applied, is generated on the basis of the input image data input to the image data input unit, including the first predetermined number of pixels; and
   a mode extracting section that extracts one of the plurality of modes stored in the mode storage section,
   the controller making control such that image processing and enlargement processing are applied to the input image data input to the image data input unit, including the first predetermined number of pixels, in the order according to the mode extracted by the mode extracting section, so as to generate the output image data to be output from the image output section, including the second predetermined number of pixels, to which image processing has been applied.

4. The image processor according to claim 3, wherein the mode storage section stores therein, as one of the plurality of modes, a mode in which the controller controls the image processing section to apply image processing to the input image data input to the image data input unit, including the first predetermined number of pixels; and controls the enlargement processing section to generate the output image data including the second predetermined number of pixels, on the basis of the input image data including the first predetermined number of pixels, to which the image processing section has applied image processing.

5. The image processor according to claim 3, wherein the mode storage section stores therein, as one of the plurality of modes, a mode in which the controller controls the enlargement processing section to generate the output image data including the second predetermined number of pixels, on the basis of the input image data input to the image data input unit, including the first predetermined number of pixels; and controls the image processing section to apply image processing to the output image data including the second predetermined number of pixels, generated by the enlargement processing section.

6. An image processing method for generating output image data including a second predetermined number of pixels, to which image processing has been applied, on the basis of input image data input to an image data input unit, including a first predetermined number of pixels smaller than the second predetermined number, comprising the steps of:
  a calculating step of calculating a value corresponding to a difference between the first and second predetermined numbers in a pixel number difference calculation section;
  a comparing step of comparing the value calculated in the calculating step with a reference value, which is used at the time of determining whether to generate intermediate image data and perform the image processing to the intermediate image data;
  a first enlargement processing step of generating the intermediate image data including a third predetermined number of pixels larger than the first predetermined number and smaller than the second predetermined number, on the basis of the input image data input to the image data input unit, including the first predetermined number of pixels in an enlargement processing section;
  a first image processing step of applying image processing to the intermediate image data including the third predetermined number of pixels, generated in the first enlargement processing step in an image processing unit;
  a second enlargement processing step of generating the output image data including the second predetermined number of pixels, on the basis of the intermediate image data including the third predetermined number of pixels, to which image processing was applied in the first image processing step in the enlargement processing section; and
  an image outputting step of outputting the output image data including the second predetermined number of pixels in an image data output section;
  wherein a processor implements the first enlargement processing step, the first image processing step and the second enlargement processing step.

7. The image processing method according to claim 6, wherein the difference between the third and second predetermined numbers is less than the reference value.

8. The image processing method according to claim 6, wherein the method further comprises an extracting step of extracting one of a plurality of modes different from each other in the order of image processing and enlargement processing when the output image data to be output from an image output section, including the second predetermined number of pixels, to which image processing has been applied, is generated on the basis of the input image data input to the image data input unit, including the first predetermined number of pixels, and
  image processing and enlargement processing are applied to the input image data input to the image data input unit, including the first predetermined number of pixels, in the order according to the mode extracted in the extracting step, so as to generate the output image data to be output from the image output section, including the second predetermined number of pixels, to which image processing has been applied.

9. The image processing method according to claim 8, wherein the plurality of modes includes a mode comprising:
  a second image processing step of applying image processing to the input image data input to the image data input unit, including the first predetermined number of pixels; and
  a third enlargement processing step of generating the output image data including the second predetermined number of pixels, on the basis of the input image data including the first predetermined number of pixels, to which image processing was applied in the second image processing step.

10. The image processing method according to claim 8, wherein the plurality of modes includes a mode comprising:
  a third enlargement processing step of generating the output image data including the second predetermined number of pixels, on the basis of the input image data input to the image data input unit, including the first predetermined number of pixels; and
  a second image processing step of applying image processing to the output image data including the second predetermined number of pixels, generated in the fourth enlargement processing step.

11. The image processor according to claim 1, wherein the image processing section applies cross filter processing to the intermediate image data.

12. The image processor according to claim 1, wherein the number of pixels in the reference value is larger than the third predetermined number of pixels and smaller than the second predetermined number of pixels.

13. The image processing method according to claim 6, wherein the first image processing step includes applying cross filter processing to the intermediate image data.

14. The image processing method according to claim 6, wherein the comparing step includes providing the reference value that is larger than the third predetermined number of pixels and smaller than the second predetermined number of pixels.

15. An image processor comprising:
  an image data input unit that inputs input image data including a first predetermined number of pixels;
  an enlargement processing section for generating output image data including a second predetermined number of pixels more than the first predetermined number, on the basis of the input image data including the first predetermined number of pixels, the enlargement processing section also generates intermediate image data including a third predetermined number of pixels larger than the first predetermined number and smaller than the second predetermined number;
  a pixel number difference calculation section for subtracting a second predetermined number of pixels to be generated in an image data output section from a first predetermined number of pixels input to the image data input unit;
  a set value storage section for setting and storing a reference value corresponding to the difference between the first predetermined number of pixels and the second predetermined number of pixels;
  a comparing section for determining a difference between a calculated value of the first and second predetermined numbers calculated by the pixel number difference calculation section, and the reference value stored in the set value storage section;
  an image processing section for applying image processing to at least one of the input image data, the intermediate image data and the output image data;

a controller for controlling the image processing section and the enlargement processing section; and the image data output section for outputting the output image data processed by the enlargement processing section and the image processing section;

wherein the image output section generates the second predetermined number of pixels on the basis of the input image data input to the image data input unit when the comparing section determines that the difference between the calculated value of the first and second predetermined numbers is less than the reference value, and the image outputting section also generates the output image data including the second predetermined number of pixels, on the basis of intermediate image data including a third predetermined number of pixels when the comparing section determines that the difference between the calculated value of the first and second predetermined numbers is more than the reference value, wherein the controller controls the image processing section to apply image processing to the intermediate image data including the third predetermined number of pixels, generated by the enlargement processing section, and the controller controls the enlargement processing section to generate the output image data including the second predetermined number of pixels, on the basis of the intermediate image data including the third predetermined number of pixels, to which the image processing section has applied image processing.

16. The image processor according to claim 15, wherein the image processing section applies cross filter processing to the intermediate image data.

17. The image processor according to claim 15, wherein a number of pixels in the reference value is larger than the third predetermined number of pixels and smaller than the second predetermined number of pixels.

* * * * *

UNITED STATES PATENT AND TRADEMARK OFFICE
CERTIFICATE OF CORRECTION

PATENT NO.        : 7,650,048 B2                                        Page 1 of 1
APPLICATION NO.   : 11/224302
DATED             : January 19, 2010
INVENTOR(S)       : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 591 days.

Signed and Sealed this

Eighteenth Day of January, 2011

David J. Kappos
*Director of the United States Patent and Trademark Office*